C. DEAVS.
Extension-Chandelier.
No. 223,893. Patented Jan. 27, 1880.
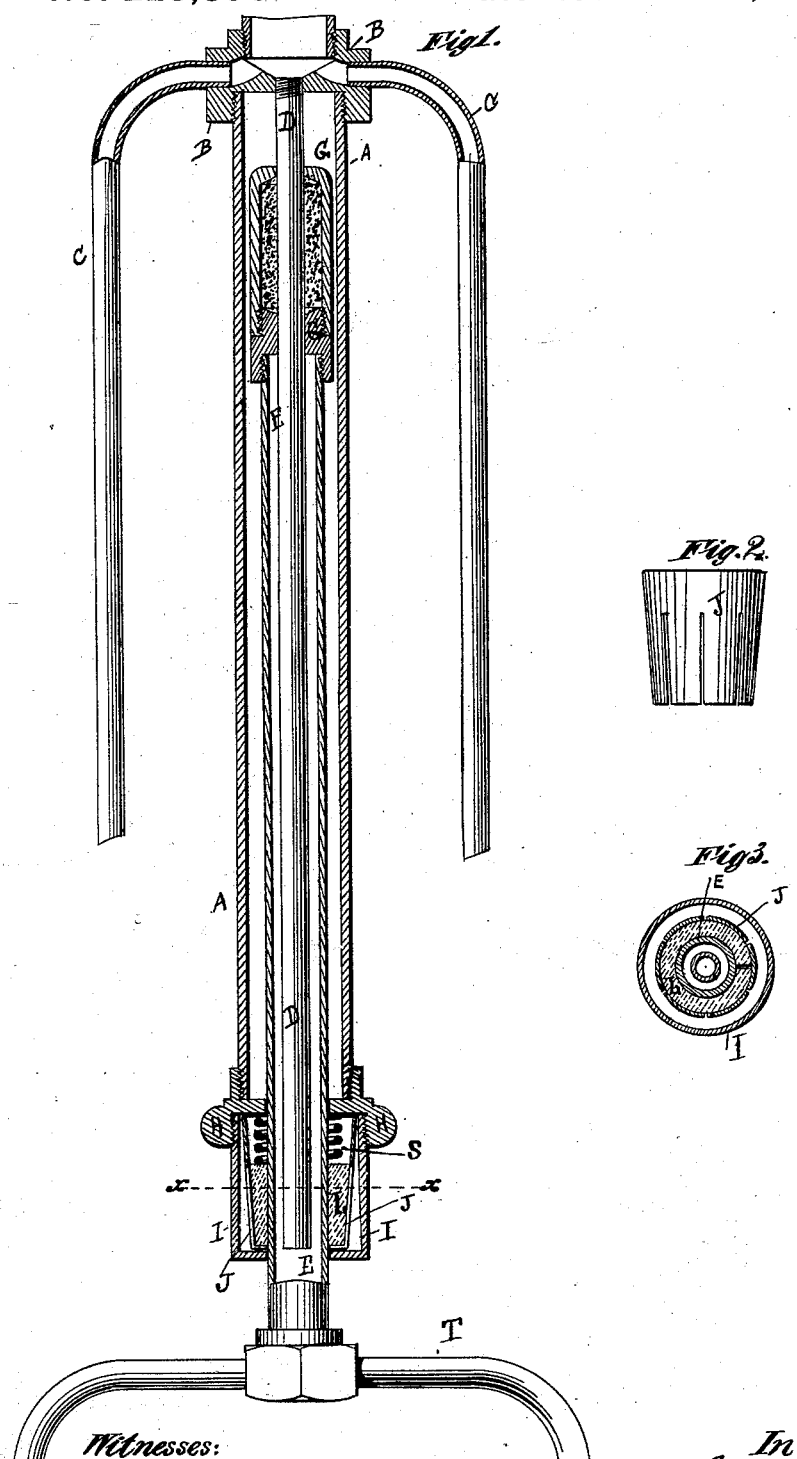
Witnesses:
Ernest C. Webb
Edwin A. Shorter
Inventor:
Charles Deavs
By J. Clayton
atty

UNITED STATES PATENT OFFICE.

CHARLES DEAVS, OF NEW YORK, N. Y.

EXTENSION-CHANDELIER.

SPECIFICATION forming part of Letters Patent No. 223,893, dated January 27, 1880.

Application filed September 20, 1879.

*To all whom it may concern:*

Be it known that I, CHARLES DEAVS, of the city of New York, in the State of New York, have invented certain new and useful Improvements in Drop-Light Gasaliers, of which the following is a correct specification.

This invention shows a simple and cheap construction of a center-slide drop-light acting upon a modification of the principles shown in Letters Patent granted to me August 22, 1871.

In this invention the drop-tube, in its downward passage through a conical washer of leather contained in thimble-spring, acts upon the said washer and thimble so as to convert them into a friction-clutch tightly grasping said tube, so that it will not only sustain the weight of the drop-light, but will require considerable force to make it drop to the desired point; but when the said drop-tube is slid upward the conical leather washer fails to act upon the thimble-spring, so that there is no clutch-action, and the only weight to be raised is that of the drop-tube and its lights and shade.

In the drawings, Figure 1 is a vertical section, showing the position and construction of the several parts when at rest, or while the drop is descending. Fig. 2 is a detail, showing the conical thimble, which has several slits around its lower edge, so as to make it act as an annular conical spring. Fig. 3 is a cross-section through line $x$ $x$ of Fig. 1.

A is the outer or main tube, secured by a thread at its upper end to the distributer B, which is provided with proper gasways for branch pipes C C and center pipe, D. E is the extension or drop tube, arranged to slide upon the pendent center tube, D, by means of a long packing-box, G, secured to upper end of tube E. H is a double screw-cap, the upper part of which closes the lower end of tube A. I is a cylindrical box screwed into the lower part of cap H, and serves to contain and protect the friction-thimble. J is a conical thimble, open at both ends, but having a shoulder at the bottom, and it is made of spring metal and provided with several slits around its lower periphery, and acts as a conical annular spring upon the conical annular elastic washer L when forced against the inner surface of the thimble. This thimble J loosely surrounds drop-tube E and is contained in box I.

L is a conical annular elastic washer, made out of a strip of leather, felt, or other similar suitable material, of such length and thickness and taper as to be bent snugly around tube E and fit closely between said tube and the inner surface of thimble J. The outer surface of this washer is scored vertically, so as to enable it to be bent around tube E.

S is a spiral spring, which is contained in box I. It is coiled loosely around the tube E, and its function is to hold the washer L down in place and make it press closely down between tube E and thimble J. T is the branch pipe from lower end of tube E.

The operation of my invention is as follows: When in a state of rest, or when the drop-tube is descending, the spring S, washer L, and thimble J act together as an annular friction-clutch, tightly grasping tube E, so as not only to sustain its weight and that of its fixtures, but to also require considerable additional force to make the drop descend. As soon, however, as upward pressure is applied to tube E the washer L is raised and disengaged from pressure upon the thimble J, so that the tube E has no clutch upon it, and can be readily raised without frictional resistance.

What I claim as my invention is—

1. In a drop-light chandelier, the combination and arrangement of the conical split thimble J, conical elastic washer L, spring S, cap H, and drop-tube E, substantially as and for the purposes set forth.

2. Tubes A, D, and E, box G, and cap H, in combination with washer L, thimble J, and spring S, substantially as specified.

CHARLES DEAVS.

In presence of—
J. C. CLAYTON,
B. F. GREEN.